United States Patent [19]
Sato et al.

[11] 3,918,743
[45] Nov. 11, 1975

[54] SIDE-STAND FOR MOTORCYCLE

[75] Inventors: Minoru Sato, Tokyo; Tadashi Aso, Saitama; Kenichi Oonishi, Higashikurume; Mitiyoshi Hashimoto, Asaka; Tuneyasu Murayama, Niiza; Tadanori Horiuchi, Ooi, all of Japan

[73] Assignee: Honda Giken Kogyo Kabushiki Kaisha, Japan

[22] Filed: Nov. 1, 1974

[21] Appl. No.: 520,003

[30] Foreign Application Priority Data
Nov. 16, 1973 Japan............................ 48-131706
Aug. 2, 1974 Japan............................ 49-92561
Aug. 2, 1974 Japan............................ 49-92562

[52] U.S. Cl................................ 280/293; 280/301
[51] Int. Cl.²........................................... B62H 1/06
[58] Field of Search...... 180/30; 280/293, 298, 300, 280/301, 303

[56] References Cited
UNITED STATES PATENTS
| 523,952 | 7/1894 | Woodward | 280/301 |
| 2,300,762 | 11/1942 | Andrews | 180/30 |
| 2,702,197 | 2/1955 | Sabatino | 280/298 |

FOREIGN PATENTS OR APPLICATIONS
| 52,305 | 9/1936 | Denmark | 280/293 |

Primary Examiner—Leo Friaglia
Assistant Examiner—Terrance L. Siemens
Attorney, Agent, or Firm—Polster and Polster

[57] ABSTRACT

A side-stand for a motorcycle wherein an auxiliary member is provided at one side of the side-stand in a length which stretches fairly beyond the contact surface of the side-stand when the motorcycle is set upright for running, whereby, even if a rider forgets to retract or level the side-stand, frictional contact between the bottom tip end of this auxiliary member and the ground surface causes the side-stand to be retracted automatically while running.

12 Claims, 16 Drawing Figures

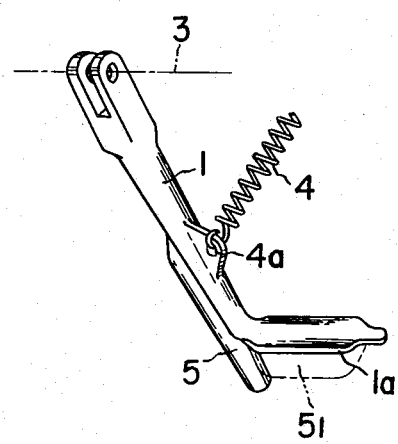
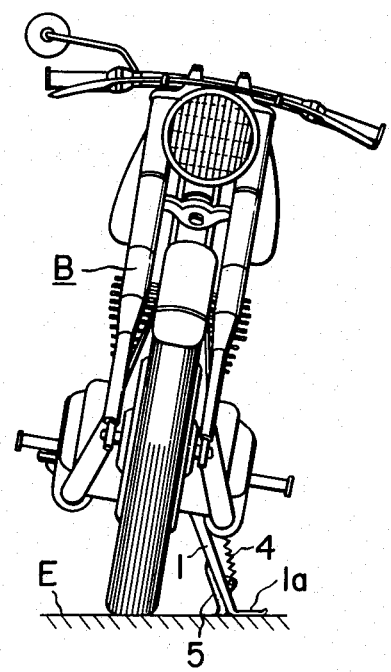
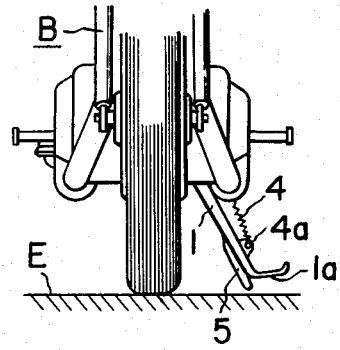
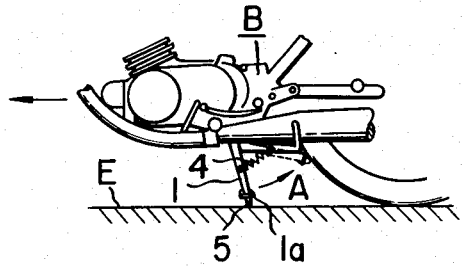

3,918,743

SIDE-STAND FOR MOTORCYCLE

BACKGROUND OF THE INVENTION

This invention relates to a side-stand for a motorcycle, and, more particularly, it is concerned with an improved construction of such side-stand which prevents the motorcycle from running without retracting or levelling the side-stand to its running position.

It takes place very often that riders of motorcycles start running their motorcycle without levelling or retracting the side-stand to its running position, so that, when the non-retracted side-stand touches a protruded object on the ground surface at the time of the motorcycle being inclined by a sharp turn, etc., the motorcycle inevitably overturns by the shock of the touch.

SUMMARY OF THE INVENTION

It is therefore the primary object of the present invention to provide the side-stand which is quite safe, even when the motorcycle starts its running without the side-stand being retracted or levelled to its running position.

According to the present invention, there is provided a side-stand for a motorcycle which comprises in combination: a body of a motorcycle; a side-stand having a bent portion to be the contact surface with the ground surface, and movably fitted at one end part thereof to said motorcycle body; and an auxiliary member fitted to one side of said side-stand, said auxiliary member being such that, when the motorcycle is to be parked, a part thereof is bent or collapsed by the weight of the motorcycle body, and, when the motorcycle is set upright to start running, the collapsed part stretches downward by its own resiliency or by an external elastic force to protrude beyond the contact surface of said side-stand to face the ground surface.

The foregoing object and other objects as well as the specific points of improvement in the side-stand according to the present inventiton will become more apparent and understandable from the following detailed description of the invention when read in conjunction with the accompanying drawing.

BRIEF EXPLANATIONS OF THE DRAWING

In the drawing:

FIG. 1 is a perspective view of the side-stand for motorcycle according to the present invention;

FIG. 2 is a front view of the motorcycle provided with the side-stand according to the present invention in its parking state;

FIG. 3 is a partial front view of the motorcycle when it is set upright for running;

FIG. 4 is a partial side elevational view showing the bottom tip end of the auxiliary member attached to the side-stand being in touch with the ground surface;

Figure 5:
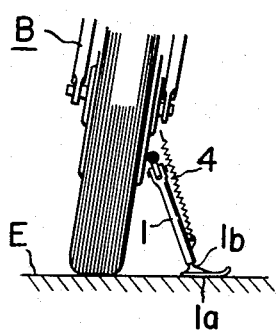
Figure 6:
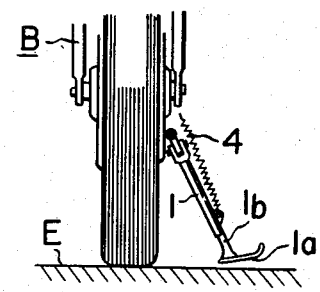
Figure 7:
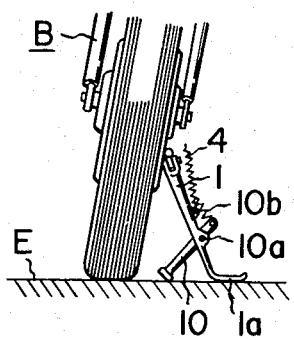
Figure 8:
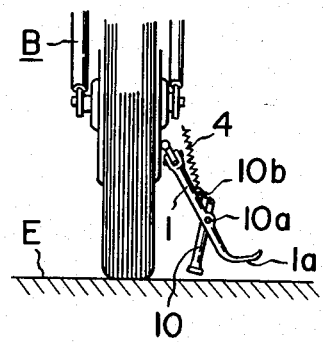
Figure 9:
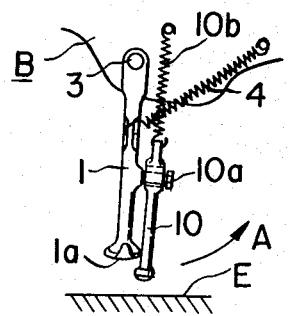
Figure 10:
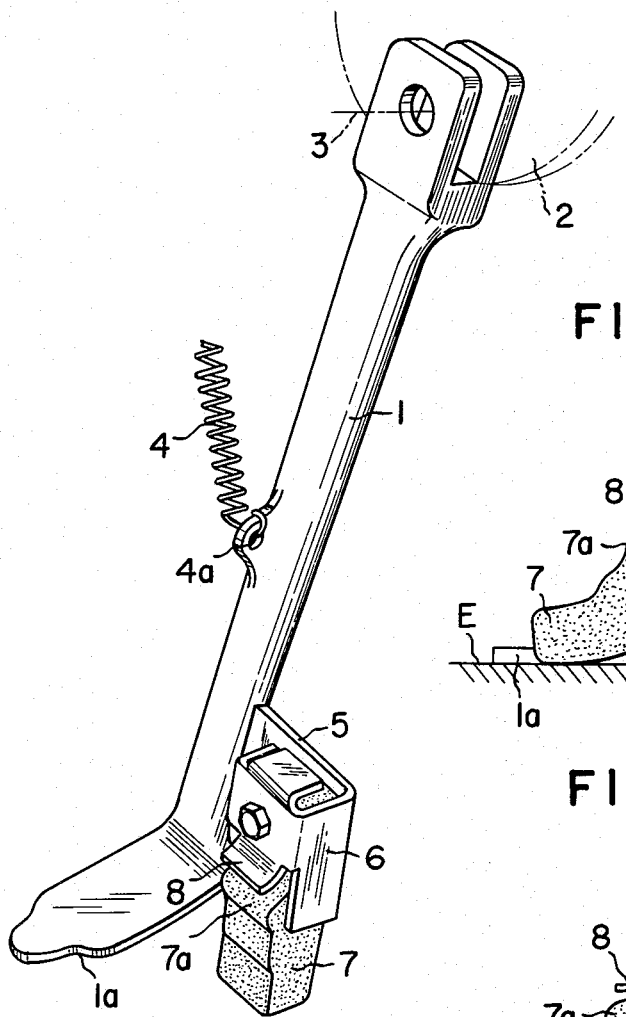
Figure 11:
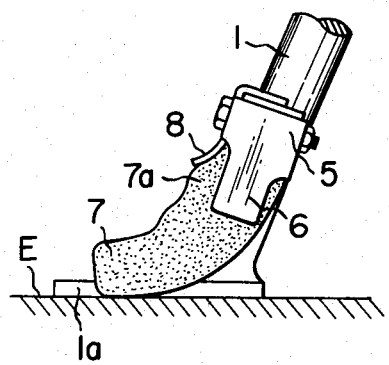
Figure 12:
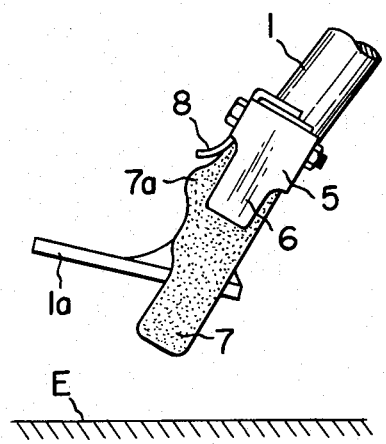
Figure 13:
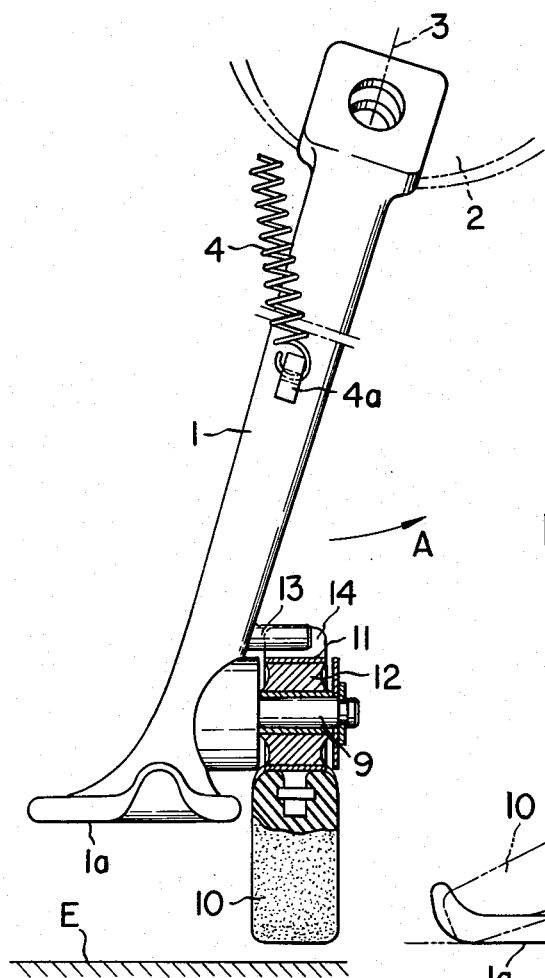
Figure 14:
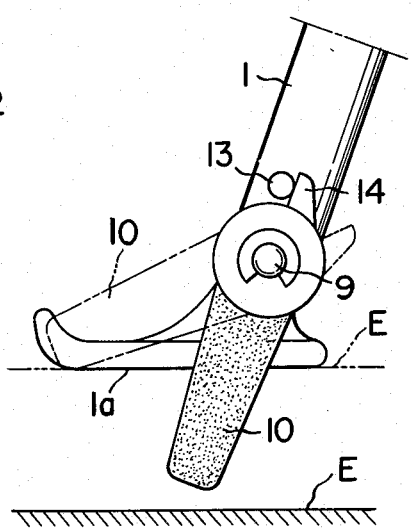
Figure 15:
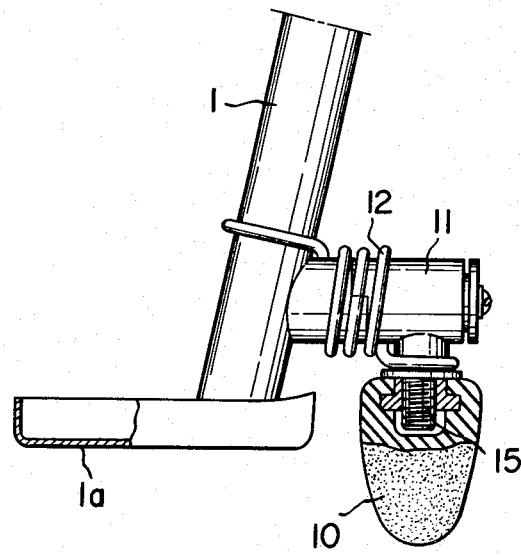
Figure 16:
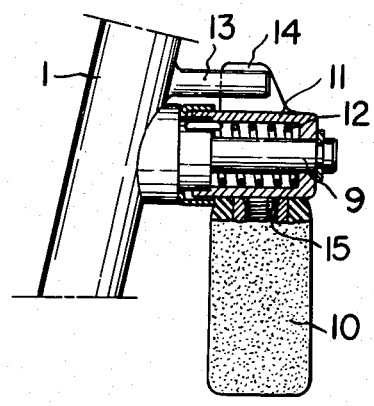

FIGS. 5 and 6 respectively indicate the motorcycle being in its parking position and in its starting position, wherein the side-stand of a telescopic type is used;

FIGS. 7, 8 and 9 are respectively partial front views and a partial side elevational view of the motorcycle, wherein the side-stand is constructed in a swingable type;

FIG. 10 is a perspective view showing another embodiment of the side-stand for motorcycle according to the present invention;

FIGS. 11 and 12 are respectively front view of the bottom tip end part of the side-stand according to the present invention, showing in FIG. 10 above, in its parking position and in its starting position;

FIG. 13 is a front view, partly in longitudinal cross-section, of still another embodiment of the side-stand for motorcycle according to the present invention;

FIG. 14 is a partial side elevational view of the side-stand, shown in FIG. 13, in its state of being apart from the ground surface for running of the motorcycle; and FIGS. 15 and 16 are respectively partial longitudinal cross-sections showing other modifications of the elastic member for the side-stand according to the present invention.

DETAILED DESCRIPTION OF THE INVENTION

Referring now to FIGS. 1 through 4 inclusive which show the first embodiment of the present invention, the side-stand 1 of ordinary type is rotatably fixed on the center axis 3 for standing and levelling of the side-stand at one part of the body of the motorcycle. At one part of this side-stand, there is provided a hook 4a for spanning a spring 4 between the body of the motorcycle and the side-stand so as to secure perfect standing and levelling of the side-stand.

The other end part of the side-stand is bent at a certain angle to constitute a contact surface 1a with the ground when the motorcycle is to be parked. Alongside a certain length of this side-stand 1, there is provided an elastic rod 5 as an auxiliary member, which, when the body B of the motorcycle is set upright for running and the contact surface 1a of the side-stand 1 is kept apart from the ground surface E, projects downward beyond the contact surface 1a of the side-stand 1.

During parking, the bottom tip end of the elastic rod 5 is bent or collapsed, so that the contact surface 1a of the side-stand 1 may contact the ground surface E to support the body B of the motorcycle.

When the motorcycle is caused to run, the body B of the motorcycle is set upright, whereupon the contact surface 1a of the side-stand 1 is separated from the ground surface E. At the same time, the bent or collapsed bottom tip end of the elastic rod 5 extends straight forwards by its own resiliency beyond the contact surface 1a of the side-stand 1 to face the ground surface E, as shown in FIG. 3. In this state of the side-stand, if the rider forgets to retract or level the side-stand 1 to its running position, and, when the body of the motorcycle inclines to cause the bottom tip end of the elastic member 5 to touch the ground surface or protruded object on the ground surface, this elastic rod 5 causes the side-stand 1 to spring back to its running position, as shown in FIG. 4, by the frictional contact thereof with the ground surface. In other words, even if the rider forgets to retract the side-stand 1 to its running position, it can be automatically levelled during the running.

Since the auxiliary member 5 is made of a resilient material, only very slight shock is transmitted to the rider in comparison with the direct touching of the side-stand per se to the ground surface as has heretofore been experienced, so that there is least apprehension of overturning of the motorcycle. Should it happen that the side-stand 1 is not automatically levelled to its running position, it can be easily detected by the feeling of the touch of the auxiliary member 5 to the ground surface E, so that the motorcycle is stopped to properly level the side-stand 1 by the rider himself.

For the auxiliary member 5, besides the rubber rod as mentioned in the foregoing, there can also be used an elastic rubber block 51 or a plate spring attached to the bottom surface of the contact surface 1a of the side-stand 1, as shown in FIG. 1.

FIGS. 5 and 6 indicate another embodiment of the side-stand according to the present invention, wherein the side-stand consisting of telescopic rods 1 and 1b, and a spring built in the rod 1 is integrally combined with the auxiliary member.

FIGS. 7, 8 and 9 indicate still another embodiment of the side-stand according to the present invention, wherein a swingable member 10 is fitted on the lower part of the side-stand 1 on an axis 10a which extends in the longitudinal direction of the motorcycle body B, and, when the body B is set upright, the swingable member 10 is stood resiliently by a spring 10b as shown in FIGS. 8 and 9 so that the tip end of the swingable member may face the ground surface E. In this case, more benefit will result when the bottom surfaces of the abovementioned telescopic stand 1, 1b and the swingable member are provided with rubber and other elastic material to increase friction between the side-stand and the ground surface.

In still another embodiment of the side-stand according to the present invention, as shown in FIGS. 10, 11, and 12, the side-stand 1 which is fixed rotatably at one fitting part 2 of the motorcycle on a center axis 3 for standing and levelling of the side-stand 1 is provided at the lower end part thereof with a bracket 5 projected outwardly from the side-stand, into which a rubber block 7 as an auxiliary member is accommodated. This rubber block is in such a shape that, when the body B of the motorcycle is set upright to separate the side-stand 1 from the ground surface, it protrudes and projects downward beyond the contact surface 1a of the side-stand to face the ground surface E. Further, a flexure preventive plate 6 is provided in contiguity to the bracket 5 to prevent the rubber block 7 from further bending backward or rearward when it is to be collapsed at the time of parking the motorcycle. This flexure preventive plate is provided at the rear side surface of the rubber block 7. The preventive plate 6 may either be formed integrally with the bracket 5, or an individual unit of such preventive plate be fixedly connected together with the bracket 5.

During the parking of the motorcycle, the bottom end of the rubber block is bent outwardly by the weight of the body of the motorcycle, whereby the contact surface 1a of the side-stand 1 touches the ground surface E to support the motorcycle.

In case of running the motorcycle, the body of the motorcycle is set upright, then the contact surface 1a of the side-stand 1 is separated from the ground surface E. At the same time, the bent or collapsed bottom tip end of the rubber block 7 stretches downward by its own resiliency, as shown in FIG. 12, beyond the contact surface 1a of the side-stand 1 to face the ground surface E. In this state of the side-stand, if the rider forgets to retracts the side-stand to its running position, and, when the motorcycle inclines to cause the bottom tip end of the rubber block 7 to touch the ground surface E, the side-stand 1 is caused to spring backward by a strong friction with the ground surface, since the rubber block 7 cannot be bent further backward on account of the flexure preventive plate 6. In other words, even when the rider forgets to retract the side-stand 1 to its running position, it can be automatically levelled during the running.

Also, as the rubber block 7 is only restricted its backward bending by means of the flexure preventive plate 6, and it can freely be bent to the left and right sides, no inconvenience accrues in the use of the side-stand, hence it is useful as the side-stand for the motorcycle.

Further, the base part 7a of the rubber block 7 is made thicker than other part of the rubber block to increase strength against the bending force, and a receiving plate 8 is integrally formed with the bracket 5 at a position where the inner side of the base portion of the rubber block applies, whereby, when the rubber block 7 is bent, the base part thereof 7a is press-contacted to the receiving plate 8 to effectively increase the restitutional force of the rubber block 7.

In other embodiment of the side-stand according to the present invention, as shown in FIGS. 13 through 16, a swingable member 10 as an auxiliary member is rotatably fitted on the lower part of the side-stand 1 through a hub 11 and a torsion spring 12. This swingable member 10 projects downward beyond the contact surface 1a of the side-stand 1 to face the ground surface, when the body B of the motorcycle is set upright for running.

FIGS. 13, 15 and 16 respectively indicate a few preferred manner of fitting the swingable member 10, wherein the torsion spring 12 is in the form of a rubber spring (FIG. 13), a coil spring fitted around the external surface of the hub 11 (FIG. 15), and a coil spring accommodated within the hub 11 (FIG. 16).

During the parking of the motorcycle, the swingable member 10 turns around an axis 9 as shown with a chain line in FIG. 14 accompanying energization of the torsion spring 12 by the weight of the body, whereby the contact surface 1a of the side-stand 1 supports the body of the motorcycle in contact with the ground surface E.

When running the motorcycle, the body is set upright, whereupon the contact surface 1a separates from the ground surface E. At the same time, the swingable member 10 is caused to stand upright by the tension of the torsion spring 12 as indicated by the solid line in FIGS. 13 and 14, whereby the bottom tip end of the swingable member 10 faces the ground surface E. This rotatory stand-up of the swingable member 10 is restricted by a stopper 13 provided in the side-stand 1 to maintain the predetermined standing position of the swingable member 10, to which a small projection 14 provided on the hub 11 collides.

When the motorcycle starts running in this state, if the body of the motorcycle inclines or there exist irregularities on the ground surface, the bottom tip end of the swingable member 10 touches the ground surface or the irregularities, whereupon the side-stand 1 is caused to spring backward to be levelled in the direction of the arrow A as shown in FIG. 13 by the friction caused between the bottom tip end of the swingable member and the ground surface, as the swingable member 10 can not oscillate back and forth. In other words, even when the rider forgets to retract the side-stand 1 to its running position, it can be automatically levelled during the running.

Same as the previous embodiment in FIGS. 10 to 12, as the swingable member is free to move left and right, no inconvenience is caused in the use of the side-stand.

Also, the swingable member 10 had better be made of or provided with rubber material at least at the bottom end part thereof to increase friction with the ground surface E.

The swingable member 10 shown in FIG. 13 is constructed integrally with the hub 11. However, as shown in FIG. 15, when it is made attachable to the hub 11 by means of a threaded screw bolt 15, it is most convenient in replacing the worn-out swingable member 10 with a new one, when it becomes necessary.

While the present invention has been illustrated and described by way of preferred embodiments thereof, it is to be understood that such are merely illustrative and not restrictive, and that variations and modifications may be made therein without departing from the spirit and scope of the present invention. What is claimed is:

1. A side-stand for a motorcycle which comprises in combination: a body of a motorcycle; a side-stand having a bent portion to be the contact surface with the ground surface, and movably fitted at one end part thereof to said motorcycle body; and an auxiliary member fitted to one side of said side-stand, said auxiliary member being such that, when the motorcycle is to be parked a part thereof is bent or collapsed by the weight of the motorcycle body, and, when the motorcycle is set upright to start running, the collapsed part stretches downward by its own resiliency or by an external elastic force to protrude beyond the contact surface of said side-stand to face the ground surface.

2. The side-stand for a motorcycle as claimed in claim 1, wherein said auxiliary member is fitted inside the side-stand in a manner, in which it is joined with a telescopic lever to be extendible and retractible by means of a spring built therein.

3. The side-stand for a motorcycle as claimed in claim 1, wherein said auxiliary member is swingably fitted to said side-stand by means of a connecting structure which comprises a shaft secured to said side-stand in a direction generally transversed of the motorcycle body, a torsion spring provided therearound, a hub, a small projection provided on said hub, and a stopper provided on said side-stand which acts to collide with said small projection to stop further backward movement of said auxiliary member.

4. The side-stand for a motorcycle as claimed in claim 3, wherein said torsion spring is a rubber torsion spring.

5. The side-stand for a motorcycle as claimed in claim 3, wherein said torsion spring is a coil spring provided inside said hub.

6. The side-stand for a motorcycle as claimed in claim 3, wherein said torsion spring is a coil spring provided around the outer peripheral surface of said hub.

7. The side-stand for a motorcycle as claimed in claim 1, wherein said auxiliary member is swingably fitted at one end part thereof to one portion of said side-stand, and is oscillated by a separate, external spring force.

8. The side-stand of claim 1 wherein the auxiliary member is a resilient shape fixedly supported at an upper part of said shape by said side-stand.

9. A side-stand for a motorcycle which comprises in combination:
   a. a body of the motorcycle;
   b. a side-stand having a bent portion to be a contact surface with the ground surface, and swingably fitted at one end part thereof to said motorcycle body; and
   c. an auxiliary member fitted to one side of said side-stand, said auxiliary member being such that one end part thereof is collapsed by the weight of the motorcycle body at the time of parking, and said collapsed end part stretches forth by its own resiliency at the time of the motorcycle being set upright for running, to protrude beyond said contact surface of said side-stand to face the ground surface.

10. The side-stand for a motorcycle as claimed in claim 9, wherein said auxiliary member is directly fitted at a lower part of said side-stand.

11. The side-stand for a motorcycle as claimed in claim 9, wherein said auxiliary member is fitted in a bracket structure comprising a bracket fixed at a lower part of said side-stand, a flexure preventive plate provided adjacent to said bracket to restrict further backward bending of said auxiliary member.

12. The side-stand for a motorcycle as claimed in claim 11, wherein a pressing plate is provided at a position which correspond to the inside of said flexing auxiliary member so as to increase the restitutional force thereof.

* * * * *